May 15, 1945.  E. OVALLE  2,376,179
TIRE FOR CAR WHEELS
Filed March 22, 1943
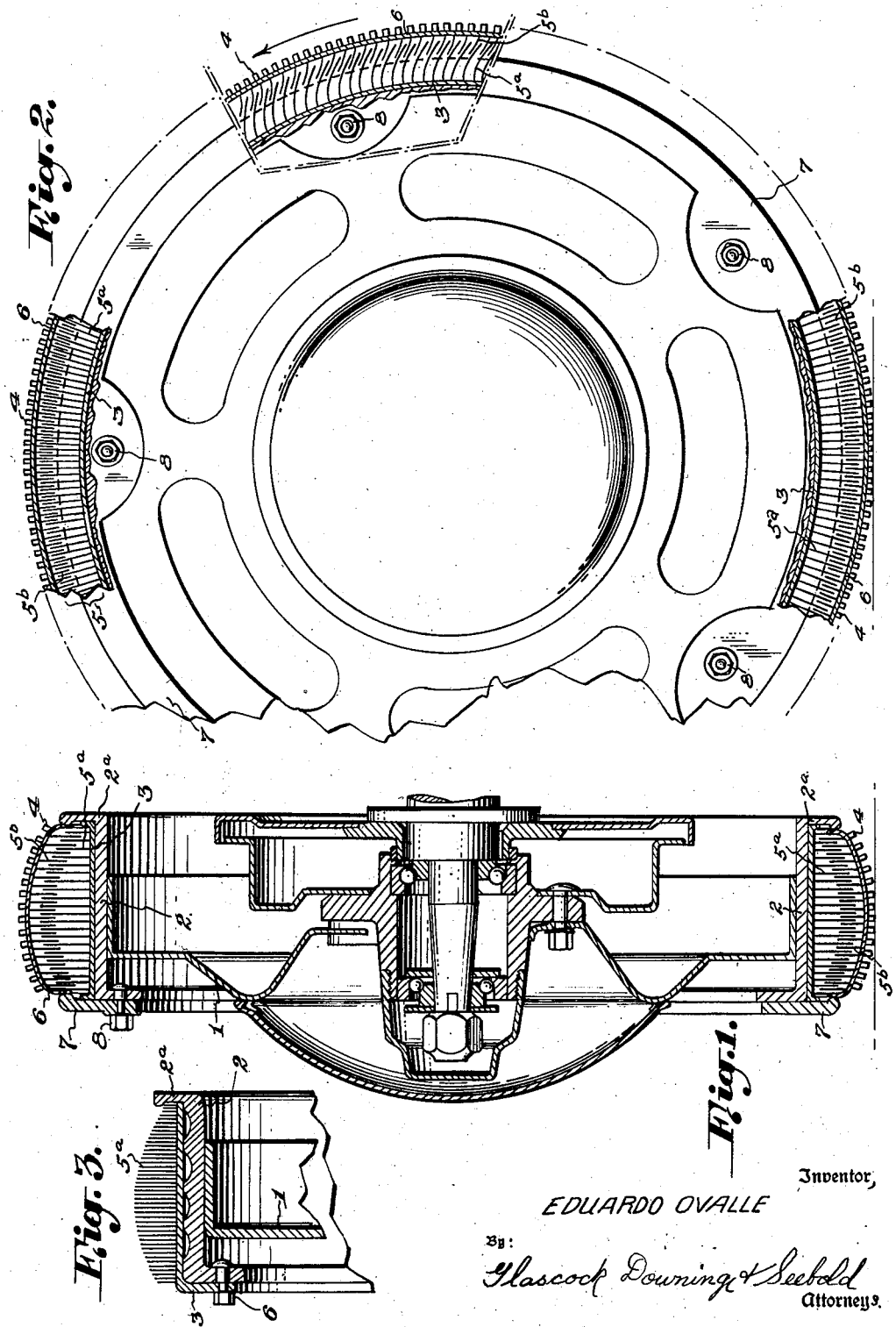
Inventor,
EDUARDO OVALLE
By: Glascock Downing & Seebold
Attorneys.

Patented May 15, 1945

2,376,179

UNITED STATES PATENT OFFICE 2,376,179

TIRE FOR CAR WHEELS

Eduardo Ovalle, Santiago, Chile

Application March 22, 1943, Serial No. 480,061
In Chile November 19, 1942

5 Claims. (Cl. 152—246)

This invention relates to improvements in resilient tires for road vehicles and more particularly to an improved tire to be used in substitution for a rubber tire or a pneumatic tire.

One of the objects of the invention is to provide a novel tire comprising interfitted resilient bristles formed of wire or the like which are designed to coact in cushioning the travel of a vehicle.

More particularly the invention embraces the provision of a resilient tire comprising a substantial circular rim portion and a tread portion, the rim portion having resilient bristles projecting away from the axis of the tire and the tread portion having resilient bristles extending toward said axis and having their end portions extending between and contacting the bristles of the rim portion so as to provide for cushioning action during travel.

Other objects, as well as the natural characteristic features and scope of the invention will be more readily apparent from the following description taken in connection with the accompanying drawing and pointed out in the claims forming a part of this specification.

The invention is clearly illustrated in the accompanying drawing in which

Fig. 1 is a vertical transverse sectional view through a wheel showing the improved tire applied thereto.

Fig. 2 is a side elevational view partly broken away and shown in longitudinal section.

Fig. 3 is an enlarged transverse sectional detail view showing the rim portion only applied to the wheel.

Similar characters of reference are employed in all of the above described views to indicate corresponding parts.

Referring now more particularly to the accompanying drawing, there is provided a disc wheel 1 on the rim of which is detachably mounted the improved tire. The tire consists of a circular rim portion 2 having an inner angular fixed flange 2a, while fitted circumferentially about the rim and against the flange is a band 3 from which project bristles 5a. Coacting with the rim portion is a tread portion of circular form which comprises a plate 6 made of metal, wood, synthetic material, or the like, having anti-skidding means 4 projecting from the outer surface and inwardly extending bristles 5b which interengage the bristles 5a and coact therewith to form an elastic band or cushioning means. The bands 3 and 6 are retained in position by means of a detachable ring forming an outer flange for the rim, the ring being detachably held in place by bolt and nut arrangements 8.

In Fig. 3 there is shown only a portion of the elastic tire, the tread portion comprising the bristles 5b and the plates 6 being omitted for the purpose of explaining the mounting and assembling of the tire.

In this respect, in order to achieve greater facility of construction and the best functioning, the following factors should be borne in mind:

The bristles 5a and 5b should be made of stainless steel, horse hair, sorghum, fibres, rubber or any other material which does not corrode and are sufficiently elastic and resistant for the transmission of the force to which it is submitted.

The bristles 5a must have a length in the proportion of 3 to 1 with respect to the bristles 5b.

The bristles 5a must be embedded and form one single piece with the band 3, so that the whole unit will be firmly fixed in position, being fastened to the rim portion 2 by means of the ring 7 clamping the band 3 against the inner flange 2a of the rim portion.

The form illustrated in Fig. 3 of a corrugated rim 2a, over which the band 3 slides more easily may also be employed.

For the constructing and mounting of the bristles 5b tread portion 6 it should be provided that:

The bristles 6b are locked on a flexible member in the form of an open or transversely split circular band which must be adaptable by locking over the bristles 5a, so that both extremities of the band after locking shall be even and in contact and level, so that, in the joining, as far as possible, there shall be no question of continuity.

The rigid or semi rigid tread portion 6 is mounted on the wheel by placing it over the band 3 carrying the bristles 5a so that its interior surface carrying the bristles 5b remains in total and continuous contact with the outer surface or bristles 5a of the said band and that, once placed the one over the other they may be tightened up by means of bolts or any other mechanical means so as to form one single body.

Once adjusted in such manner the band of bristles 5b, the plate 6 constituting the tread portion 6, the weight thereof will be borne by the band of bristles 5a, and the edges of the plate 6 will be located between the flange 2a and the ring 7, which will be tightened by means of the bolts or nuts 3, so that the tire shall have free play in the vertical sense, but not horizontally.

It is believed in view of the foregoing description that a further detailed description of the operation of the invention is unnecessary. Likewise, it is believed that the advantage of the invention will be readily apparent.

Having thus fully described the invention, what is claimed as new and desired to be claimed by Letters Patent is:

1. A resilient tire for vehicle wheels comprising a substantially circular rim portion and tread portion, the rim portion having resilient bristles projecting away from the axis of the tire, and the tread portion having resilient bristles extending toward said axis and having their end portions extending between and contacting the bristles of the rim portion.

2. A tire as claimed in claim 1 in which both the rim portion and tread portion are detachably mounted on a wheel.

3. A tire as claimed in claim 1 in which the tread portion is split transversely of the tire.

4. A tire as claimed in claim 1 in which the tread portion includes a band provided with non-skid elements projecting away from said axis.

5. A tire as claimed in claim 1 in which the tread portion includes a flexible transversely split band surrounding all of said bristles and provided at its exterior with non-skid elements.

EDUARDO OVALLE.